Figure 1:
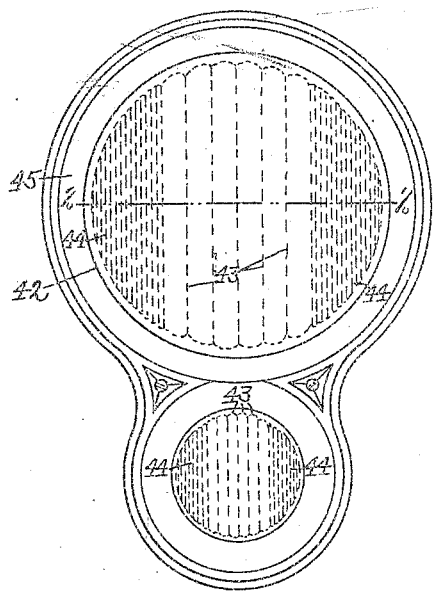

April 21, 1925.
C. A. B. HALVORSON, JR
HEADLIGHT
Original Filed April 7, 1920   2 Sheets—Sheet 1

1,534,849

Inventor.
Cromwell A. B. Halvorson
by Jas. H. Churchill
Atty.

April 21, 1925.

C. A. B. HALVORSON, JR

HEADLIGHT

Original Filed April 7, 1920    2 Sheets-Sheet 2

Patented Apr. 21, 1925.

1,534,849

UNITED STATES PATENT OFFICE.

CROMWELL A. B. HALVORSON, JR., OF LYNN, MASSACHUSETTS.

HEADLIGHT

Original application filed April 7, 1920, Serial No. 371,929. Divided and this application filed October 14, 1922. Serial No. 594,464.

*To all whom it may concern:*

Be it known that I, CROMWELL A. B. HALVORSON, Jr., a citizen of the United States, residing in Lynn, in the county of Essex and State of Massachusetts, have invented an Improvement in Headlights, of which the following description, in connection with the accompanying drawings, is a specification, like characters on the drawings representing like parts.

This invention relates to an illuminating device or headlight for use on automobiles and like vehicles, and more particularly to a glass or light-transmitting member for said headlight with which a superior lighting effect upon the roadway may be obtained.

To this end, the headlight is provided with a glass or light-transmitting member having prisms or devices of different angular dispersive power which act on rays of light passing through the glass to effect a greater angular dispersion of some rays of light than other rays, and which prisms or devices are vertically arranged on said glass or light-transmitting member with a device of lesser angular dispersive power located between devices of a greater dispersive power so as to act on rays of light which are unacted upon by the devices of greater angular dispersive power.

The prisms or devices of greater angular dispersive power are preferably arranged on opposite sides of the vertical central portion of the glass or light-transmitting member and are employed to obtain a relatively wide or great diffusion laterally of a beam of light passing through them to obtain proper illumination of the roadway laterally of the headlight and of the gutters of said roadway.

The prisms or devices of lesser angular dispersive power are located between the side prisms at the central portion of the glass or light-transmitting member and are employed to effect a lesser lateral diffusion of a beam of light passing through them, to obtain the required or desired length of beam in front of the headlight to illuminate the roadway at the desired or required distance in front of the headlight, and also to obtain sufficient lateral spread of the center beam of light to cause it to merge with the beam of light projected through the side prisms and thereby obtain a substantially uniform unbroken or continuous illumination of the roadway transversely thereof and laterally of the headlight.

The glass or light-transmitting member is especially useful in a headlight having a reflector in front of its light-source to project rays of light through the prisms of greater angular dispersive power, and having a reflector in rear of said light source to project rays of light through the prisms of lesser angular dispersive power, substantially as shown and described in another application Serial Number 371,929 filed by me April 7, 1920, of which this application is a division.

The particular features of the invention will be pointed out in the claims at the end of this specification.

Fig. 1 is a front elevation of one form of headlight embodying this invention.

Figure 2:
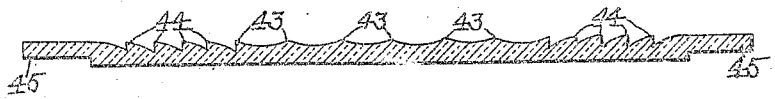
Figure 3:
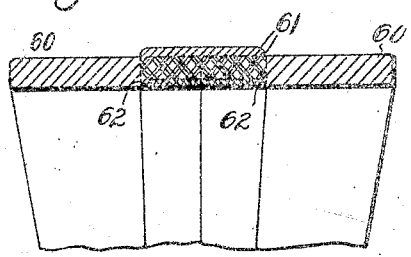

Fig. 2, an enlarged section of the glass or light-transmitting member shown in Fig. 1 and taken on the line 2—2, Fig. 3, a diagrammatic view to illustrate the character of the beam produced with the glass shown in Figs. 1 and 2, where the beam is projected on a target at a material distance in front of the headlight.

Figure 4:
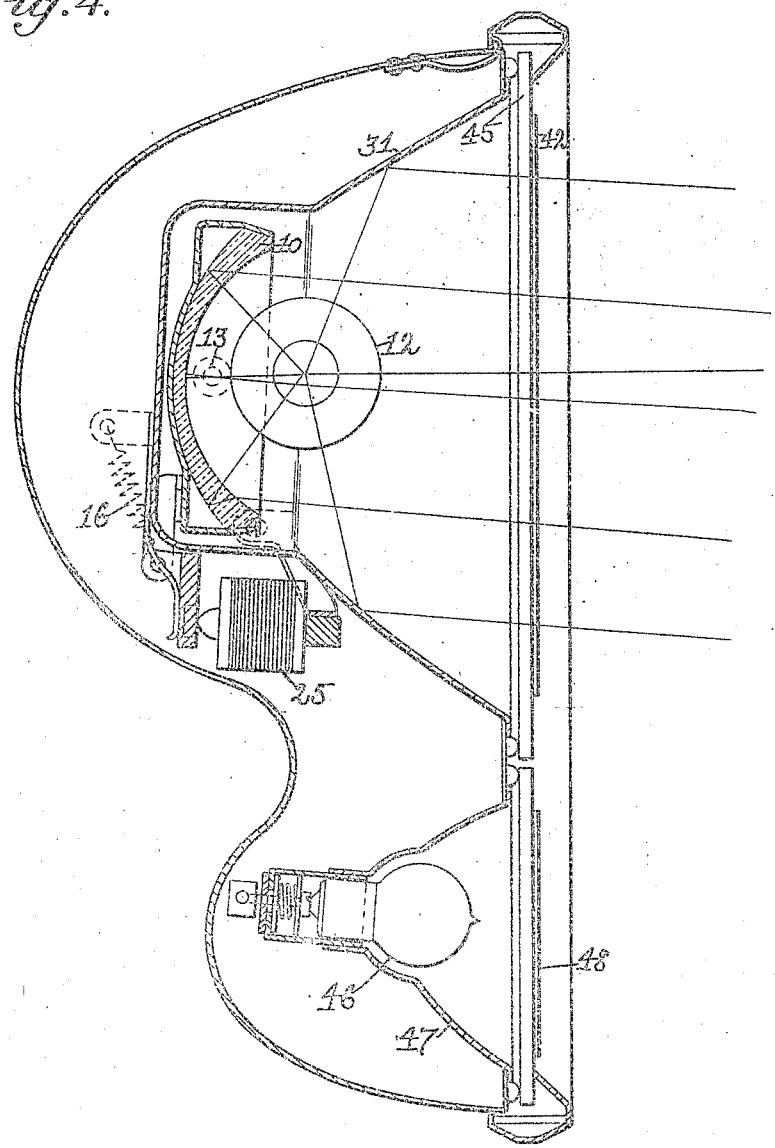

Fig. 4, an enlarged vertical section of the headlight shown in Fig. 1.

Referring to the drawings, 42 represents a glass or light-transmitting member, which will be hereinafter termed the glass, which in accordance with this invention is provided with prisms or devices 43, 44 of different angular dispersive power, which are arranged on the glass with the prisms 43 of lesser angular dispersive power located substantially at the central portion of the glass and between the prisms 44 of greater angular dispersive power, which are located at the sides of the glass on opposite sides of said central portion.

The prisms 43 are constructed or shaped so as to obtain a lesser angular dispersion than the prisms 44, and preferably an angular dispersion of from 7 to 10 degrees, and in the present instance, the prisms or devices 43 are substantially widely separated from one another and are connected by shallow curves to obtain a smooth graded dispersion of the rays of light projected through them.

The side prisms 44 are suitably constructed or shaped to obtain a greater angular dispersion of the rays of light projected through them and preferably an angular dispersion of about 20 degrees.

The rays of light projected through the side prisms 44 are employed for illuminating the sides of the roadway and the gutters thereof, in proximity to the vehicle on which the glass is used, whereas the rays of light projected through the prisms 43 are employed for illuminating the roadway in front of the vehicle for the desired or required distance, and these latter rays therefore have a less angular dispersion than the side rays so as not to diminish their intensity to such extent as to prevent proper illumination of the roadway at the desired or required distance in front of the vehicle.

By reference to Figs. 1, 2 and 3, it will be seen that the rays of light which pass through the prisms 43 of lesser angular dispersive power, are not acted upon by the prisms 44 of greater angular dispersive power, and therefore are of greater intensity in front of the vehicle than the rays which pass through the prisms 44 of greater angular dispersive power.

The prisms or devices 43 of lesser angular dispersive power co-operate with the prisms 44 of greater angular dispersive power to obtain a continuous or unbroken illumination transversely of the roadway in front of the vehicle and laterally beyond the sides of the latter (see Fig. 3), while at the same time providing the proper or desired intensity of beam of light in front of the vehicle to obtain the required or desired illumination in front of the vehicle.

The glass 42 may and preferably will be provided with an annular flange or rim 45 beyond that portion in which the prisms are formed, and in the present instance the prisms 43 of lesser angular dispersive power are shown as extended substantially the full diameter of the glass proper, but it is not desired to limit the invention in this respect.

It may be preferred to locate the prisms on the rear surface of the glass so that the latter may be provided with a smooth front surface, which is easily cleaned, but it is not desired to limit the invention in this respect or to the prisms of lesser angular dispersive power being located on the same surface as the prisms of greater dispersive power.

A glass of the character described is especially useful with a headlight such as shown in the application referred to and in Figs. 1 and 4, wherein a reflector 31 is located in front of the light source or lamp 12, and a reflector 10 is located in rear of said light source, for in such a headlight, the greater volume of light is projected by the reflector back of the light source, and to obtain the benefit of this greater volume of light for lighting the roadway at a material distance in front of the vehicle, the prisms of lesser angular dispersive power are arranged on the glass to co-operate with it so that the intensity of the beam of light produced by the rear reflector is not materially reduced and is of relatively high intensity, whereas the light projected by the reflector in front of the light source is of less volume and the prisms of greater angular dispersive power are arranged on the glass to co-operate with it so as to materially reduce the intensity of the beam of light projected by the front reflector, and thereby produce a second beam of light of relatively low intensity and of larger area than the beam of relatively high intensity.

It will therefore be seen, that when a glass having side prisms of greater angular dispersive power and intermediate prisms of lesser angular dispersive power is employed on a headlight having a reflector in front of the light source and a reflector in rear of the light source, a very efficient headlight is provided in that a relatively wide lateral diffusion of the beam of light projected by the front reflector is obtained for illuminating the gutters and sides of the roadway, and in that a lesser lateral diffusion of the beam of light projected by the rear reflector is obtained for illuminating the roadway in front of the vehicle with a light which merges with the side lights to form a substantially continuous light extending transversely of the roadway (see Fig. 3), which extends in front of the vehicle the desired or required distance to properly illuminate the roadway.

By providing the glass with prisms of lesser angular dispersive power and with prisms of greater angular dispersive power and arranging the said prisms so that they act independently of one another on different portions or groups of the light rays, a lesser lateral diffusion of the rays of light of one portion or group, and a greater lateral diffusion of the rays of light of another portion or group may be effected, so as to produce a beam of light which at a given distance from the headlight has a zone of relatively high intensity and lesser lateral spread between zones of light of relatively greater lateral spread whose intensity is relatively low with relation to the intensity of the zone of lesser lateral spread but is of the required intensity for the zones of greater lateral spread, whereby distant lighting of the desired intensity and of the required spread horizontally and proximate side lighting of the desired lateral spread and of the required intensity are obtained.

The headlight shown in Figs. 1 and 4 is provided with a dimmer unit 50, which is provided with a glass 48 of the same character as the glass 42 and with a lamp 46 and reflector 47.

The reflector 10 shown in Fig. 4 is moved on pivots 13 by an electromagnet 25 and spring 16 as fully described and claimed in the application referred to.

In Fig. 3 is illustrated the character of the driving light produced with the glass or lens shown in Figs. 1 and 2. This driving light comprises a plurality of smooth zones of light numbered 60, 61 and 62.

The zones 60 are the side zones of lower intensity and form part of the widely spread beams produced by the prisms 44 of greater refractive power.

Between the side zones 60 and merging therewith is a zone 61 of light produced by the prisms 43 of lesser refractive power. The prisms 43 form a substantially central beam of light which co-operates with the wide spreading beams and form with the latter the zone 61 of relatively high intensity.

As shown in Fig. 1, the prisms 43 extend the full diameter of the glass, and the top and bottom portions of these prisms form zone 62, which also co-operates with the wide-spreading beams to form the high intensity light.

Claims—

1. A headlight lens comprising zones of vertical prisms, the central zone comprising vertical shallow cylindrical prisms, and the outer zones each comprising oppositely faced substantially semi-cylindrical convex prisms of greater refractive power than the prisms of the central zone.

2. In a headlight for producing a distant lighting beam of relatively high intensity, and a proximate lighting beam of lower intensity, in combination, a light source, a reflector, and a lens comprising a plurality of substantially vertical groups of prisms, each group composed of a plurality of vertical curved prisms, the prisms of the central group being of shallow curvature to spread slightly the rays passing through them, and the prisms of the outer groups being of greater curvature to greatly spread the rays passing through them, said lower intensity beam merging with the zone of light of high intensity.

3. A headlight lens comprising a plurality of vertical groups of prisms, the central group being composed of a plurality of vertical shallow prisms to slightly and laterally spread light passing therethrough substantially equally on each side of the axis of the central group, a right hand group comprising a plurality of vertical prisms of greater curvature than that of the central prisms and constructed so that they will refract rays passing therethrough sidewise and away from the axis of the lens, and a left hand group comprising a plurality of vertical prisms of greater curvature than that of the central prisms and constructed so that they will refract rays passing therethrough sidewise and away from the axis of the lens.

4. In an illuminating device, in combination, a light source, a reflector located in front of said light source to project a beam of light of relatively low intensity, a reflector located behind said light source to project a beam of light of relatively high intensity, and a glass co-operating with said reflectors, and constructed and arranged to obtain a beam of light having a zone of light of relatively high intensity and limited lateral spread between zones of light of relatively low intensity and greater lateral spread in a substantially horizontal plane through the longitudinal axis of said beam.

In testimony whereof, I have signed my name to this specification.

CROMWELL A. B. HALVORSON, Jr.